United States Patent
De Gabriele et al.

[11] Patent Number: 5,964,180
[45] Date of Patent: Oct. 12, 1999

[54] LINE MARKER

[76] Inventors: Becky S. De Gabriele, 315 Grand View Park Dr.; Julie R. Winter, 264 32½ Rd., both of Grand Junction, Colo. 81503

[21] Appl. No.: 09/215,412

[22] Filed: Dec. 18, 1998

Related U.S. Application Data

[63] Continuation-in-part of application No. 08/858,735, May 19, 1997, abandoned.

[51] Int. Cl.[6] .................................................. A01M 29/00
[52] U.S. Cl. ..................................... 116/209; 116/DIG. 33
[58] Field of Search ........................... 116/209, DIG. 33; 40/319

[56] References Cited

U.S. PATENT DOCUMENTS

| | | | |
|---|---|---|---|
| 297,487 | 4/1884 | Bacon | 116/209 |
| 3,685,482 | 8/1972 | Ryder | 116/209 |
| 3,926,141 | 12/1975 | Taylor | 116/209 |
| 4,265,195 | 5/1981 | Higgins | 116/209 |
| 4,489,669 | 12/1984 | Carman | 116/209 |
| 4,742,796 | 5/1988 | Halsey | 116/209 |
| 4,885,835 | 12/1989 | Osgood | 116/209 X |
| 5,176,099 | 1/1993 | Katz et al. | 116/209 |
| 5,224,440 | 7/1993 | Cox | 116/209 |
| 5,280,765 | 1/1994 | Segerström | 116/209 |
| 5,372,335 | 12/1994 | Yenzer et al. | 244/33 |
| 5,425,328 | 6/1995 | Larumbe | 116/209 |

FOREIGN PATENT DOCUMENTS

| | | | |
|---|---|---|---|
| 1284766 | 1/1962 | France | 116/DIG. 33 |
| 2735648 | 2/1979 | Germany | 116/DIG. 33 |

*Primary Examiner*—Michael Brock
*Assistant Examiner*—Willie Morris Worth
*Attorney, Agent, or Firm*—Edwin L. Hartz

[57] ABSTRACT

A marker used for alerting people and animals of a span of line between attachment points has two identical parts for ease of manufacture and of assembly. Either gripper teeth are integral with the parts or partitions are integral with the parts and cooperate to grip the line to be marked.

5 Claims, 4 Drawing Sheets

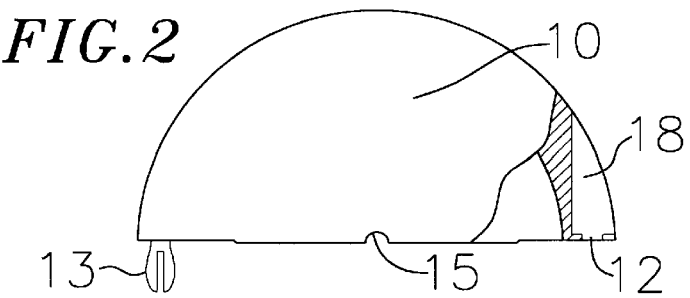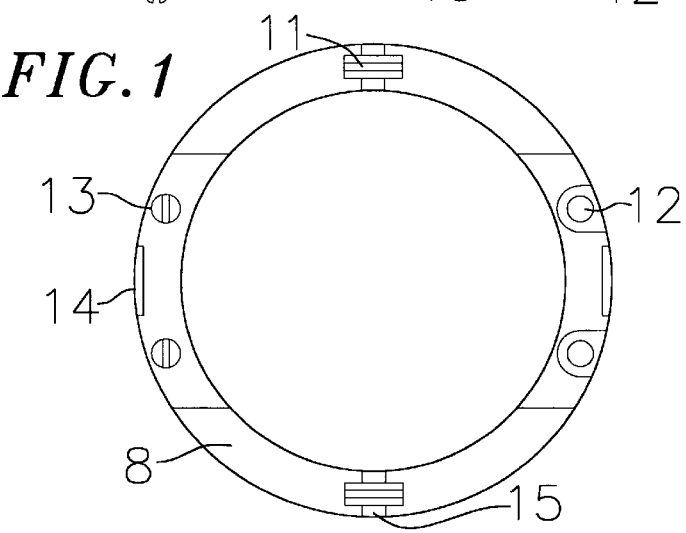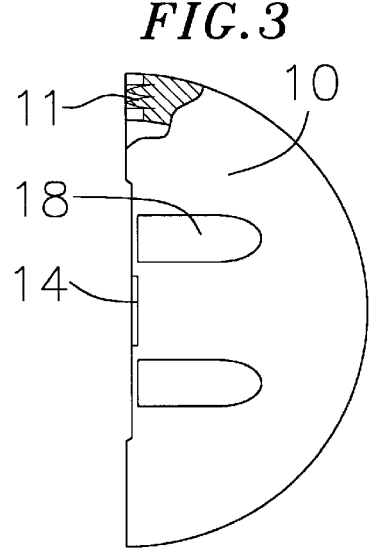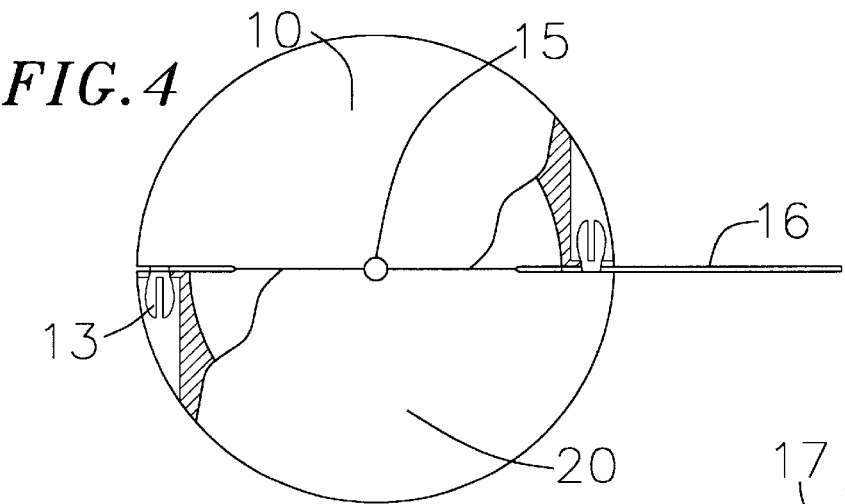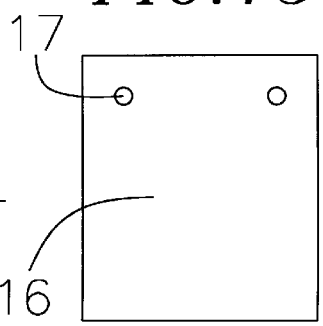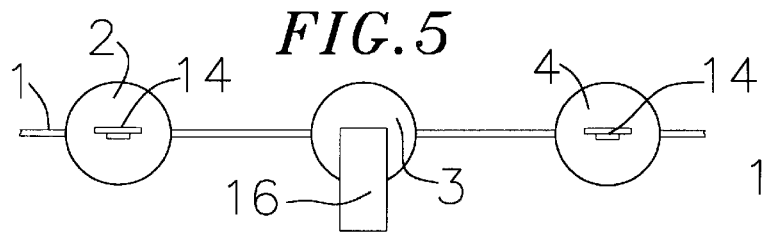

LINE MARKER

RELATED APPLICATIONS

This application is a continuation-in-part application of application Ser. No. 08/858,735 filed May 19, 1997, and entitled Line Marker (now abandoned).

BACKGROUND OF THE INVENTION

1. Field of the Invention

This invention relates to markers for lines, such as electric wire or other types having a uniform diameter, where the use, e.g., electric wire to confine, involves spans between attachment locations with a resultant need to warn of the existence of the line.

2. Prior Art

It has been recognized for some time that line spanning points of attachment, such as electric wire between fence posts, can be difficult to see and presents a possible safety problem. Other lines spanning points of attachment that can present a safety problem include rope securing corners or edges of a tent to a ground stake and line anchoring an airplane. Such lines may be a hazard to animals as well as humans. In general, any line across an open space presents a hazard.

Line markers that rely on elements of the line being marked to retain them in place are not useful on smooth line or line having a uniform diameter.

An example of a marker that relies on elements of the line being marked for holding the marker in place is disclosed in U.S. Pat. No. 297,487 granted C. H. Bacon on Apr. 22, 1884. However, the device disclosed in the Bacon patent is not useful on line, such as electric fence wire, because there is nothing to keep it in place on a smooth wire, i.e., wire that has an essentially uniform diameter throughout its length. It is stated in column 3 at lines 28 to 35 of the Bacon patent that "If some provision or means were not present on the wire to limit the longitudinal movement of the visible guards and signals, the same would be liable to nest or collect at one or the other ends of the wire adjacent to the posts owing to the motion of the wind or to caprices of individuals." The means present on the wire in the Bacon patent are the barbs of the barbed wire [Col. 3, line 26–28 of Bacon]. There is nothing integral or that is part of the guide or marker that keeps the marker in place on the wire.

Approaches to mark line, such as electric fence line, have not been satisfactory because of difficulty in keeping the marker in place on the line.

In the past, line has been marked by cloth strips or some other material tied to the line at selected intervals in the open space. The problem with this approach is that the cloth or other material does not stay in place and typically has a short life. Cloth, especially, deteriorates when exposed to the elements, such as wind, rain, freezing temperatures or excessively high temperatures.

Another approach is drilling through a ball, like a hollow, plastic ball or ping-pong ball, and threading the line through the holes. This approach is cumbersome and work intensive. Additionally, it is difficult to get the ball to stay in the desired location.

SUMMARY OF THE INVENTION

The line marker of the present invention stays in place, is readily noticeable, is long lasting, is reusable and is aesthetically pleasing in appearance. The line marker of this invention grips the line, such as the smooth wire for electric fences, and thereby stays in place. The gripping means is integral with the marker; i.e., it is part of the marker.

The marker preferably has two identical halves that, when assembled, grip the line for stationary positioning. Although, the parts may have any configuration, including two halves of a cube, the preferred configuration is a sphere with the two halves being hemispheres.

In one embodiment, the hemispheres are solid and have a channel along a diameter to accommodate the line to be marked. On the flat surface adjacent the channel near the two edges at the ends of the channel, teeth span the channel. When the two halves are assembled with the line in the channels and across the teeth, the teeth cooperate to grip the line in a manner similar to the teeth of a pair of pliers that close on a line to grip it.

In another embodiment, the hemispheres are hollow with a wall thickness that provides a flat surface near the edge of the circular face of the hemisphere. The teeth for gripping the line are positioned near the opposite ends of a common diameter. A short channel in the area of the teeth helps position the line.

The marker preferably has two identical halves that, when assembled, grip the line for stationary positioning. The parts are held together by spring pins that fit in opposing holes of the parts. The spring pins can be molded with a part or can be separate elements used at time of assembly.

The parts may be held together by other means such as spring clips around the two parts when assembled or by a spring clip across two projections of the mating parts.

The marker has one or more slits, when spring pins or similar holding means are used, to permit the parts to be pried apart for use in a different location or at a later time. Markers using spring clips or nuts and bolts for the holding means are also reusable.

In a preferred embodiment, the hemispheres are hollow with thin walls that have an indentation near each end of a common diameter that form holes to accommodate the line within a range of diameters when the parts are assembled. The gripping means is moved toward the center of the hemispheres. A partition is provided on each side of the center in each hemisphere. Each partition extends from the inside curved surface of the hemisphere to a chord that lies in the plane of the circular face of the hemisphere. Each partition is in a plane that is perpendicular to the common diameter of the indentations.

When assembled, the two partitions of one hemisphere mate with the partitions of the other hemisphere to grip the line passing along the common diameter of the indentations. Each partition is relieved, i.e., has a reduced wall thickness, in the area where the cooperating partitions grip the line to provide some give in the material to be able to close the parts about the line. The give in the partitions also permits the use of the marker on a range of wire sizes, e.g., electric wire in the range of 12 AWG to 18 AWG. The wire size of course depends on the use of the line.

The parts are held together by a biased tab with a shoulder that fits in an opposing hole in the mating hemisphere. Each hemisphere has a tab on one side and a hole on the diametrically opposite side. The assembled parts are easy to take apart by pressing the ends of each tab against the bias to get the shoulder of each tab over the corresponding hole and pushing the tabs back through the holes. Flat surfaces are provided in the area of each tab and each hole to facilitate the dislodging of the tabs for separation of the parts.

The line markers of this invention may be readily produced in a number of sizes, shapes and colors and out of a number of different materials. Preferably, the markers have two identical parts for ease of manufacture, ease of assembly and low cost.

Other features and advantages of this invention will become apparent from a consideration of the description, the appended claims and the accompanying drawing.

BRIEF DESCRIPTION OF THE DRAWINGS

FIG. 1 is a top plan view of one of the pieces of the marker in accordance with this invention;

FIG. 2 is a rear elevation view, partially cut away, of the marker piece of FIG. 1;

FIG. 3 is a right-side elevation view, partially cut away, of the marker piece of FIG. 1;

FIG. 4 is an assembled marker consisting of two identical pieces in accordance with this invention;

FIG. 5 is an elevation view of markers on a length of line in accordance with this invention;

FIG. 13 is a front elevation view of a flag for attachment to the markers of FIGS. 1 through 5 in accordance with this invention.

DESCRIPTION OF PREFERRED EMBODIMENTS

Figure 10:
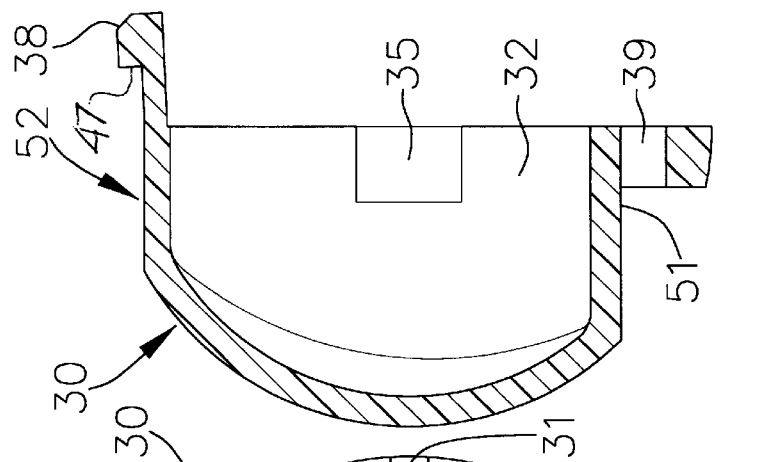
FIG. 10 is a cross-sectional view along section lines 10—10 of FIG. 6.

Line markers of this invention preferably have two identical parts for ease of manufacture and assembly. The preferred shape of the parts is essentially hemispherical and the preferred shape of the assembled marker is essentially a sphere. The shapes are not full hemispheres and spheres because of flat surfaces added to accommodate the holding means and, in some cases, to facilitate separation of the parts. These flat surfaces also reduce the cost of molds and molding.

The hemispheres may be solid or hollow, with the hollow hemisphere being preferred because of less material being required with a resulting lower cost. Also, the preferred material is plastic because it results in a lightweight marker that may be molded.

The line marker shown in FIGS. 1–4 has two identical parts 10 and 20 that are held together on the line to be marked.

As shown in FIG. 5, a line 1 of indeterminate length is marked for alerting people and animals of the existence and location of the line. The line is marked by markers 2, 3 and 4, which are spherical in shape and have the design of parts 10 and 20 of FIGS. 1–4 or parts 30 and 40 of FIGS. 6–12.

The line 1 is representative of electric fence that has an essentially uniform diameter between points of attachment.

The hollow hemispherical part 10 shown in FIGS. 1–3 has a flat surface 8 in the plane of the circular face of the hemisphere. A series of teeth 11 are located near the ends of a common diameter along which the line to be marked passes. The top of the teeth 11 cooperates with corresponding teeth on the mating part to grip the line.

Two holes 12 that cooperate with spring pins 13 are positioned on opposite sides of a second diameter and near one end of this diameter. A pair of spring pins 13 is positioned near the opposite end of the second diameter. The first and second diameter is at right angles to one another. The spring pins 13 are positioned to engage corresponding holes 12 on the mating part when assembled to hold the marker together. The pins 13 compress for insertion in a hole 12 and spread apart to hold the parts together. A channel 15, having a depth to accommodate the line to be marked is provided in a solid marker and extends from edge to edge. The gripper teeth 11 extend across this channel. The line fits in the channel 15 to provide ease of assembly and to not deform the part upon assembly. The gripper teeth 11 may be separate elements, but are preferably molded onto a part 10 or 20 at the time of molding.

An indentation 14 is provided near each hole 12 and spring pins 13 to accommodate a tool, such as a screwdriver, to pry apart the marker for relocation or later use.

For ease of manufacture and assembly, the outer surface of part 10 has an indentation 18 under the holes 12. The assembled marker shown in FIG. 4 has pins 13 extending through holes 12 into the indentation 18.

In FIG. 4 the areas around the spring pins are partially broken away to illustrate the parts 10 and 20 held together by spring pins 13.

A flag 16 shown in FIG. 13 has holes 17 spaced apart the same distance as the holes 12 in FIG. 1 so that the flag may be placed over two spring pins 13 during assembly of a marker. In this way, the flag 16 will be securely held in place on the marker. The flag may carry information such as "Posted Property—No Trespassing" or "No Hunting" or any other desired message.

The material used for the marker is selected to provide long life and usefulness. Plastic, incorporating an ultraviolet absorber, is easy to mold with the line grippers 11, holes 12, spring pins 13, indentations 14 for release and channels 15 to allow line passage as part of the mold. Also, other means to secure the parts on the line may be used in place of the spring pins.

The plastic part may advantageously be a bright color or have a fluorescent surface or a reflective surface for greatest visibility. Other materials may be used for the markers and may also be colored or painted for high visibility.

The line markers of FIGS. 1 to 4 have a relatively thick shell that results in a flat surface 8. The shell may be made thinner by using partitions for strength.

Figure 6:
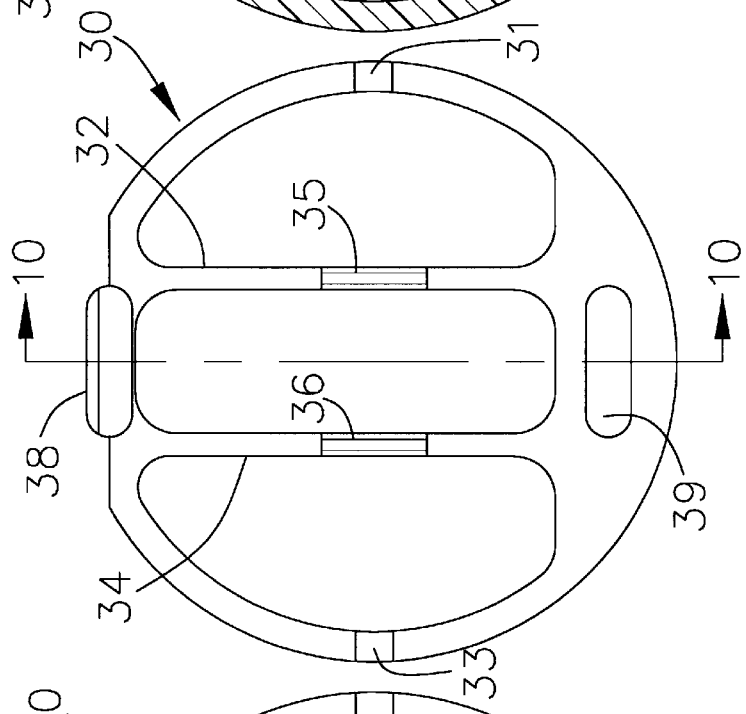
FIG. 6 is a top plan view of one of the pieces of a marker with partitions in accordance with the invention.
Figure 7:
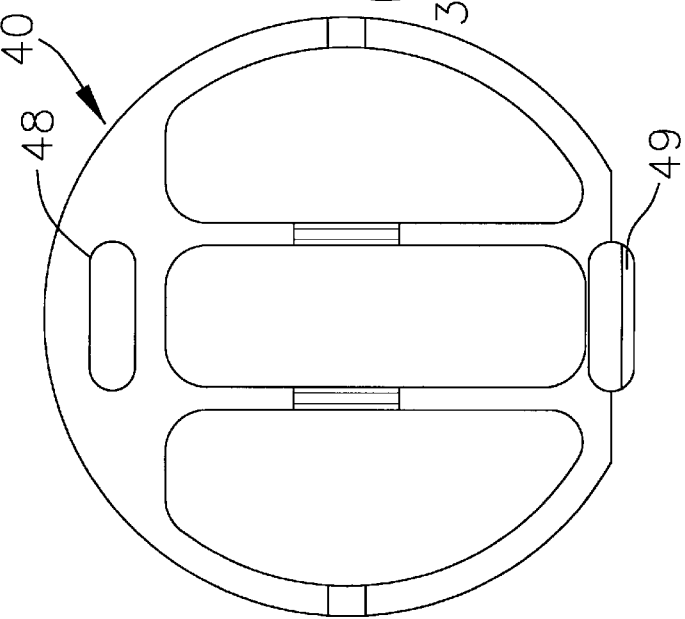
FIG. 7 is a top plan view of the second identical piece of a marker in accordance with the invention.
Figure 8:
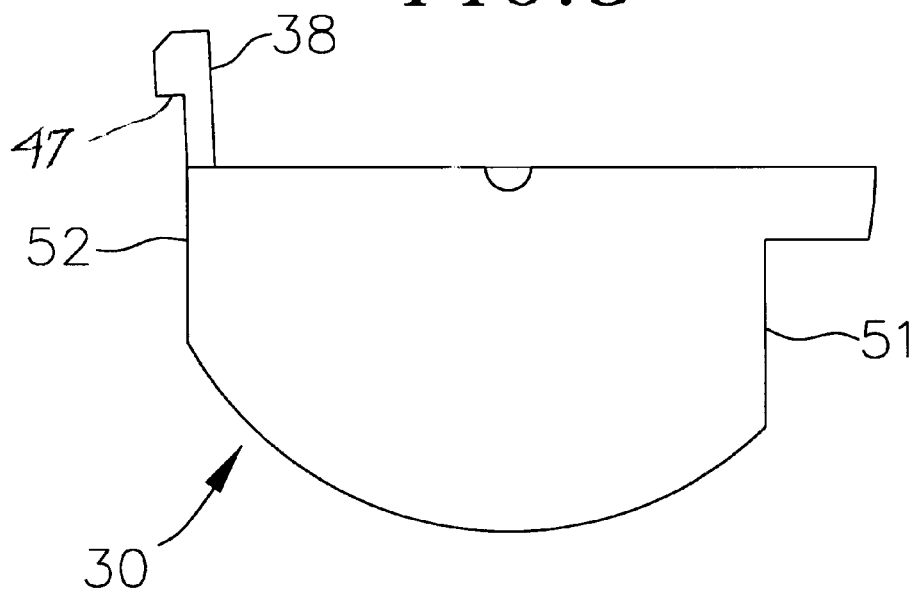
FIG. 8 is a left side elevation view of the piece of FIG. 6 in accordance with this invention.

Thinner walled modified hemispheres 30 and 40 are shown in FIGS. 6 and 7. The hemispheres are identical; therefore, only hemisphere 30 will be described in detail.

A first partition 32 is on the right side of the centerline represented by section line 10—10 in FIG. 6. A second partition 34 is on the left side of the center and is parallel to partition 32 and the same distance from the center as partition 32. The line to be marked is positioned perpendicular to the planes of the partitions 32 and 34 and is guided in place by indentations 31 and 33 in the sidewalls. The indentations provide relief to accommodate different wire sizes to avoid deformations of the marker during assembly of the parts. The hole that is formed by the mating parts and the indentations 31 and 33 accommodate different wire sizes. For example, electric fence wire may be in the range of 12 AWG to 18 AWG and the hole is made large enough to accommodate the 12 AWG wire.

Figure 9:
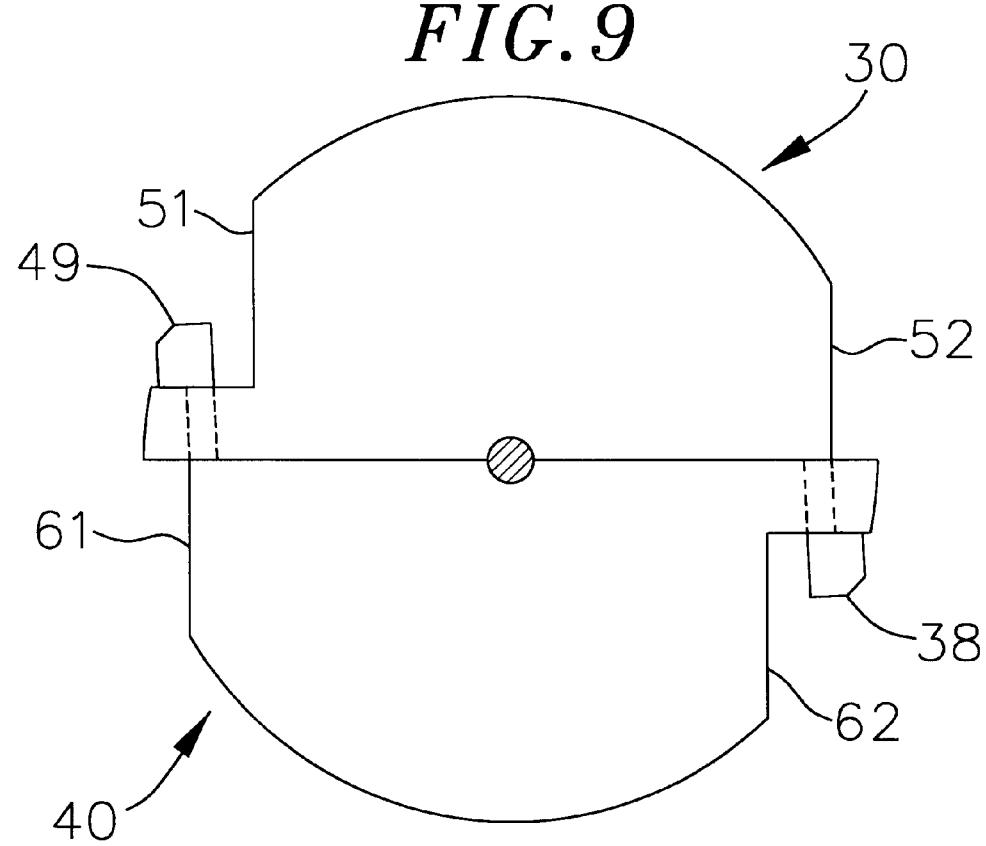
FIG. 9 is an elevation view of the two pieces of FIGS. 6 and 7 assembled around a line in accordance with this invention.
Figure 11:
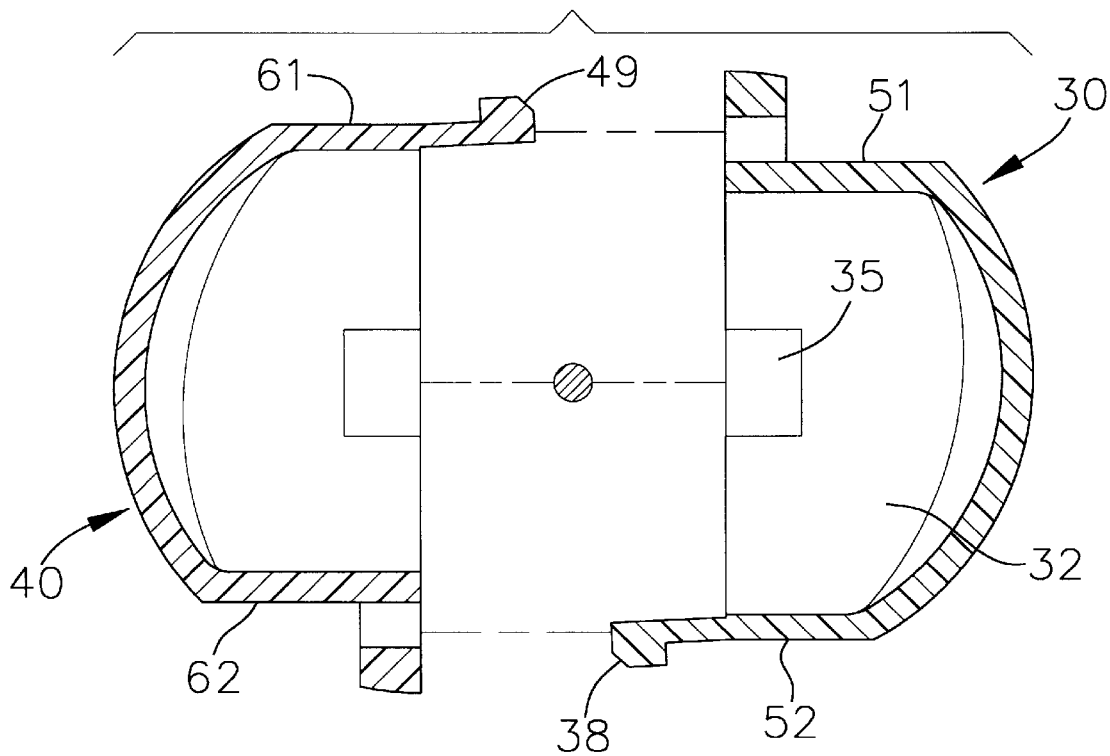
FIG. 11 is a cross-sectional view through the middle of the two pieces of FIGS. 6 and 7 in position to be assembled in accordance with the invention.
Figure 12:
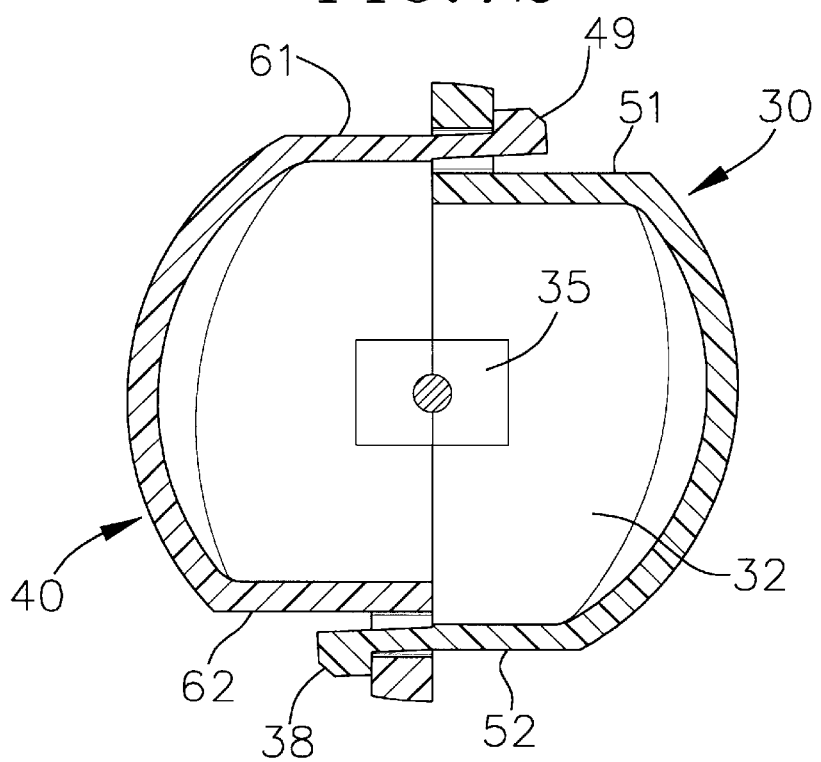
FIG. 12 is a cross-sectional view through the middle of the two pieces of FIGS. 6 and 7 fully assembled in accordance with this invention.

Each partition 32 and 34 has a reduced width or relief 35 and 36 in the center area where the line crosses to provide movement in this area of the partition to accommodate the line while cooperating with the corresponding partitions of the mating hemisphere to grip the line to hold the marker in place as shown in FIGS. 9 and 12.

Hemisphere 30 has means for securing or holding this hemisphere in place when joined with a mating hemisphere 40. The holding means are a biased tab 38 and a mating hole 48. Each tab 38 of part 30 and tab 49 of part 40 is angled away from the center of the part to provide a spring action when inserted in a corresponding hole 48 and 39. The tabs, as shown by tab 38, has a shoulder 47 to keep the tab from coming back out of the hole 48.

Below tab 38 is a flat surface 52 and below hole 39 is a flat surface 51. The flat surfaces are provided for ease of releasing one part from another. To separate parts 30 and 40 when assembled as shown in FIGS. 9 and 12, the top of tabs 38 and 49 are pushed toward the corresponding flat surfaces 62 and 51, against the bias of the angled tabs. As the shoulder 47 clears the edge of the hole, each tab is pushed back through the hole 48 and 39, respectively.

Although preferred embodiments of the line markers have been shown and described above, the invention is not limited to these specific embodiments, but rather the scope of the invention is to be determined as claimed.

What is claimed is:

1. A marker for a line spanning two attachment points comprising a first part, a second part, means for gripping the line to prevent movement of the marker along the line, said gripping means being formed by portions of the first and second parts cooperating when the parts are assembled, and means for holding the two parts together on the line when assembled.

2. A marker in accordance with claim 1 wherein the two parts are identical in configuration and size and have an essentially hemispherical shape when assembled.

3. A marker in accordance with claim 2 wherein the two parts are hollow with thin outer walls, further comprising indentations in the thin walls along a common diameter to form holes to accommodate the line within a range of diameters when the parts are assembled.

4. A marker in accordance with claim 3 wherein the gripping means comprises a pair of parallel partitions in the first part, a pair of parallel partitions in the second part that cooperate with the partitions in the first part when assembled to provide the gripping means, the plane of each partition being perpendicular to the common diameter.

5. A marker in accordance with claim 3 wherein the holding means consists of a tab on the first part and a hole on the second part and a tab on the second part and a hole on the first part, each tab having a shoulder to keep the tab from coming out of the corresponding hole and being biased outwardly.

* * * * *

UNITED STATES PATENT AND TRADEMARK OFFICE
CERTIFICATE OF CORRECTION

PATENT NO. : 5,964,180
DATED : October 12, 1999
INVENTOR(S) : Becky S. De Gabriele It is certified that error appears in the above-identified patent and that said Letters Patent is hereby corrected as shown below:

Claim 2, line 3, change "hemispherical" to -- spherical---.

Signed and Sealed this

Thirteenth Day of June, 2000

Attest:

Q. TODD DICKINSON

*Attesting Officer*              *Director of Patents and Trademarks*